United States Patent
Hagiuda

[11] Patent Number: 5,953,008
[45] Date of Patent: Sep. 14, 1999

[54] SOURCE FILE EDITING APPARATUS

[75] Inventor: Nobuyoshi Hagiuda, Yokohama, Japan

[73] Assignee: Nikon Corporation, Tokyo, Japan

[21] Appl. No.: 08/942,330

[22] Filed: Oct. 1, 1997

Related U.S. Application Data

[60] Provisional application No. 60/040,916, Mar. 27, 1997.

[30] Foreign Application Priority Data

Oct. 1, 1996 [JP] Japan ................................. 8-26098

[51] Int. Cl.$^6$ ................................................ G06F 17/00
[52] U.S. Cl. ........................................... 345/339; 345/333
[58] Field of Search ..................................... 345/339, 326, 345/327, 328, 340, 341, 342, 343, 344–347, 348, 349–354, 333, 329–332, 334–338, 433, 441, 118; 707/4–8, 513–514

[56] References Cited

U.S. PATENT DOCUMENTS

| | | | |
|---|---|---|---|
| 5,111,409 | 5/1992 | Gasper et al. | 345/302 |
| 5,341,469 | 8/1994 | Rossberg et al. | 707/514 |
| 5,347,627 | 9/1994 | Hoffmann et al. | 345/334 |
| 5,524,244 | 6/1996 | Robinson et al. | 395/705 |
| 5,646,675 | 7/1997 | Copriviza et al. | 348/1 |
| 5,678,039 | 10/1997 | Hinks et al. | 707/4 |
| 5,682,441 | 10/1997 | Ligtenberg et al. | 382/232 |
| 5,737,599 | 4/1998 | Rowe et al. | 395/615 |
| 5,781,785 | 7/1998 | Rowe et al. | 395/774 |
| 5,799,310 | 8/1998 | Anderson et al. | 707/102 |
| 5,819,301 | 10/1998 | Rowe et al. | 707/513 |
| 5,826,265 | 10/1998 | Van Huben et al. | 707/8 |

*Primary Examiner*—Steven P. Sax
*Attorney, Agent, or Firm*—Oliff & Berridge, PLC

[57] ABSTRACT

A source file editing apparatus accomplishes various concatenation editing by displaying source files, especially image files, as thumbnails and controlling the thumbnails using an intuitive process. A reader reads a path from a starting point to an ending point of a drag-and-drop operation. A display processor respectively displays on a screen a plurality of thumbnails corresponding to each of a plurality of source files including image data and/or voice data. The display processor moves a first thumbnail corresponding to the starting point of the drag-and-drop operation read by the reader to an ending point of the drag-and-drop operation. A file editor detects how the first thumbnail moved and displayed by the display processor and a second thumbnail displayed on the screen are overlapping each other. The file editor executes preset concatenation editing to the source files corresponding to each of the two thumbnails depending on how the thumbnails are overlapping each other. Source files can be edited in a manner in which the source files are continuously played.

15 Claims, 10 Drawing Sheets

Fig. 1

Block Diagram Showing Principle of Invention Described In

Screen Showing Thumbnails

Fig. 9

Selecting Thumbnail C

Fig. 10

Dragging (the thumbnail C)

Fig. 11

The thumbnail overlaps the Thumbnail B

Fig. 12

Thumbnail C overlaps the Thumbnail B

Fig. 13

Thumbnail C overlaps the Thumbnail B

Fig. 14
Related Art

SOURCE FILE EDITING APPARATUS

RELATED PROVISIONAL APPLICATION

This nonprovisional application claims the benefit of Provisional Application No. 60-040,916, filed Mar. 27, 1997 pending.

INCORPORATION BY REFERENCE

The disclosure of the following priority application is herein incorporated by reference: Japanese Patent Application No. 8-260985, filed Oct. 1, 1996.

BACKGROUND OF THE INVENTION

1. Field of Invention

The invention relates to a source file editing apparatus which edits source files. In particular, the invention relates to a source file editing apparatus which displays source files as thumbnails and concatenates, i.e. links, source files in various ways to edit the source files so as to operate, i.e. control, thumbnails of the source files in an intuitive manner.

Regarding the invention, formats and actual contents of the data in the source files are not of particular importance so long as the source files are files that can be edited. For example, image files and voice files can be source files. However, image files are mainly explained herein to simplify the descriptions.

Moreover, the invention pertains to concatenating, i.e. linking, and editing bases to join a plurality of files that are the subject of editing so as to create one file. In addition, the function of editing can be either to delete files before joining and placing them into one file, or to create a newly edited file while keeping the source files.

2. Description of Related Art

Figure 14:
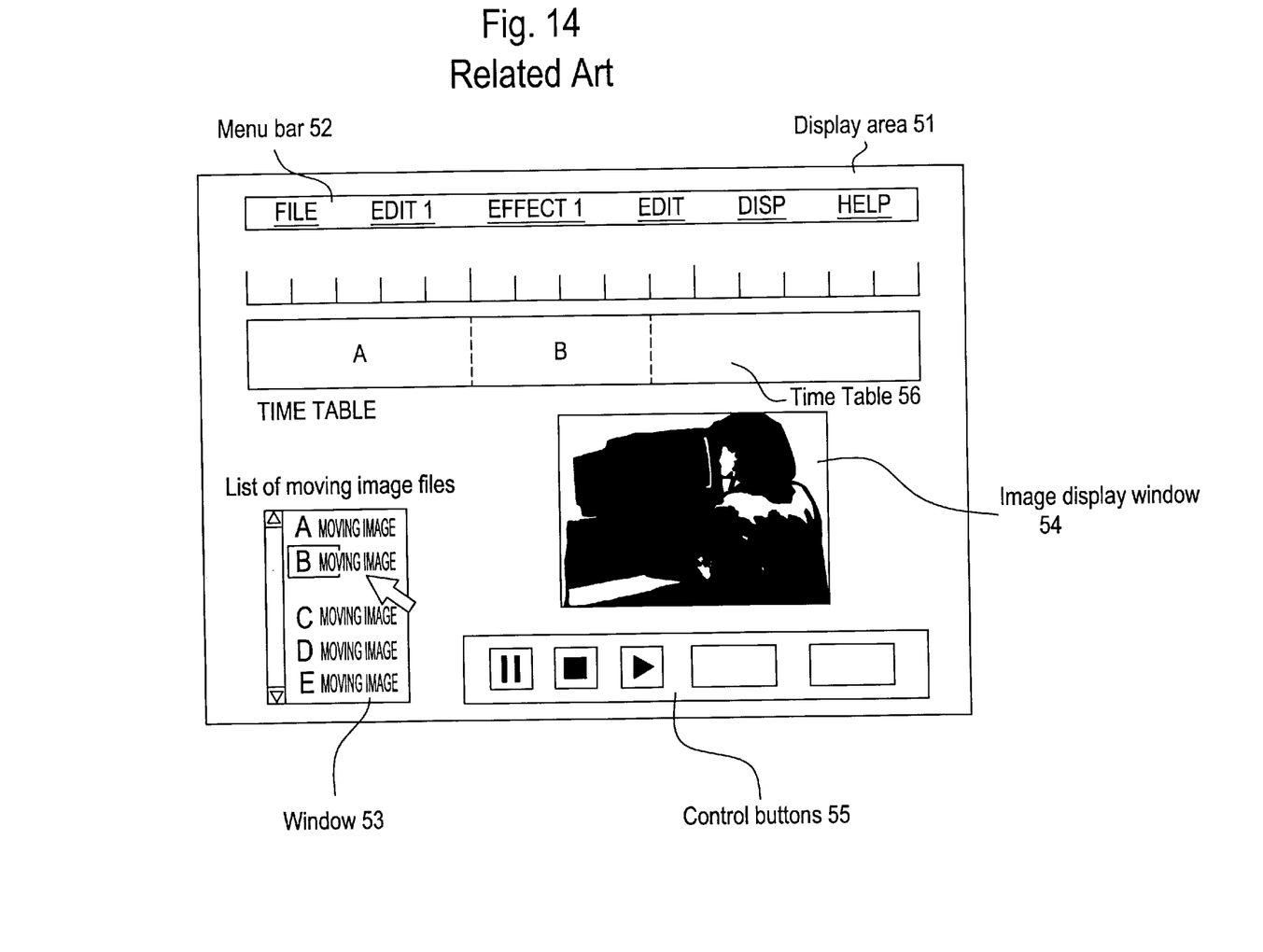
FIG. 14 is a screen showing operations for image editing using conventional moving image editing software.

Recently, software that accomplishes high level and highly skilled image editing on a personal computer has been used. For example, software such as "Premiere" from U.S. Adobe Corp. is known. FIG. 14 shows a screen showing image editing using this type of moving image editing software. An operator edits moving images in a display area 51 employing the following steps. First, a moving image file to be edited is selected from a recording medium using a menu bar 52. The moving image files selected in such a way are listed in a window 53. Then, the operator further selects a moving image file one by one from the moving image files listed in window 53. Contents of the moving image file selected in window 53 are displayed in an image display window 54. The operator accomplishes operations, such as play, stop, or pause, using a control button with respect to the moving image files selected.

In addition, the operator repeatedly drags the moving image file in the window 53 onto a time table 56. With such operation, a plurality of moving image files arranged on the time table 56 are edited in a manner in which selected portions of the selected moving image files are played in sequence.

As described above, in conventional image editing software, image editing is achieved by repeating operations, such as moving the moving image file displayed in the image display window 54 onto the time table 56 using the control button 55. Therefore, with conventional image editing software, multiple windows have to be displayed on one screen simultaneously, which makes it difficult for small screens to be used as a display.

Especially, in portable and compact source file editing apparatus, there are problems because the displays are extremely small. As a result, it is hard to see each image and thus difficult for the operator to recognize images.

Moreover, there is the problem that since the list of the moving image files displayed on the window 53 is small, it is difficult to select and control the moving image files. Especially, there is a problem in the case where the moving image files are selected using a touch panel and selecting and controlling of the moving images cannot be executed quickly because the area pointed by a finger is too large.

Furthermore, there is a problem that because the editing operations are accomplished by using multiple windows, a large amount of time is required to learn the editing operations. In particular, since editing operations dealing with a multiple number of windows is complicated and difficult, it is extremely difficult for beginners to accomplish various types of image editing.

SUMMARY OF THE INVENTION

In order to solve the problems described above, it is an object of the invention to provide a source file editing apparatus which can implement concatenating and editing source files in various ways with simple controls as well as being able to proceed with accurate operations, even while editing with small screens.

It is another object of the invention to provide a source file editing apparatus which provides excellent portability.

It is a further object of the invention to provide a source file editing apparatus which can accurately concatenate two source files with controls in an intuitive manner.

It is another object of the invention to provide a source file editing apparatus which can properly add effects of fade-in and fade-out into the source file using simple operations.

It is a further object of the invention to provide a source file editing apparatus which can instantaneously understand the contents of editing when an operator proceeds with editing by concatenation.

The source file editing apparatus of the invention includes a reading unit that reads a path from a starting point to an ending point of a drag-and-drop operation. A display unit respectively displays on a screen a plurality of thumbnails corresponding to each of a plurality of source files including one or both of image and voice data files, and moves a first thumbnail corresponding to a starting point of the drag-and-drop operation read by said reading unit to an ending point of the drag-and-drop operation. A file editing unit detects how a first thumbnail moved and displayed by said display unit and a second thumbnail displayed on said screen are overlapping each other. Preset concatenation editing is executed to the source files corresponding to each of the two thumbnails depending on how the thumbnails are overlapping each other The source files are edited into a format in which the source files are continuously played.

BRIEF DESCRIPTION OF THE DRAWINGS

These and other aspects and advantages of the invention will become apparent from the following detailed description of preferred embodiments when taken in conjunction with the accompanying drawings, in which.

DETAILED DESCRIPTION OF PREFERRED EMBODIMENTS

While the invention will hereinafter be described in connection with preferred embodiments thereof, it will be understood that it is not intended to limit the invention to those embodiments. On the contrary, it is intended to cover all alternatives, modifications and equivalents that may be included within the spirit and scope of the invention as defined by the appended claims.

For a general understanding of the features of the invention, reference is made to the drawings. In the drawings, like reference numerals have been used throughout to designate like elements.

Figure 1:
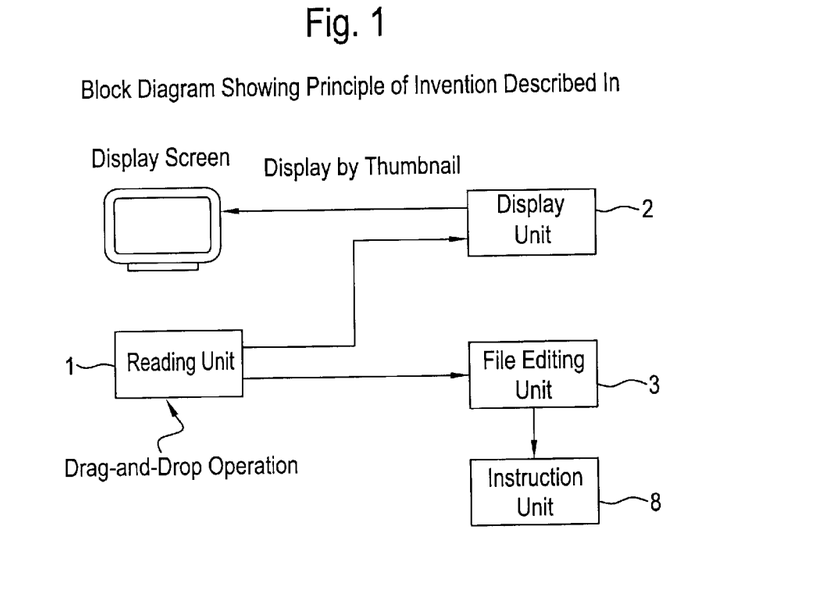
FIG. 1 is a high-level functional diagram of one aspect of the invention.

FIG. 1 is a high-level representation of the invention. The invention includes a reading unit 1 for reading a path of a drag-and-drop operation from a starting point to an ending point. A display unit 2 respectively displays on a screen a plurality of thumbnails corresponding to each of a plurality of source files which include image or voice data. The display unit 2 also provides for display and moving of a first thumbnail corresponding to a starting point of a drag-and-drop operation, read by the reading unit 1, to an ending point of the drag-and-drop operation. A file editing unit 3 detects that a first thumbnail moved and displayed by the display unit 2 and a second thumbnail displayed on the screen are overlapping each other. As a result, preset concatenation editing is executed to source files corresponding to each of the two thumbnails depending on how the thumbnails overlap each other. In this manner, the source files are edited such that the source files are continuously played. According to an aspect of the source file editing apparatus of the invention, the reading unit 1 is a touch panel which detects a position of a contacting body that contacts the surface thereof.

Figure 2:
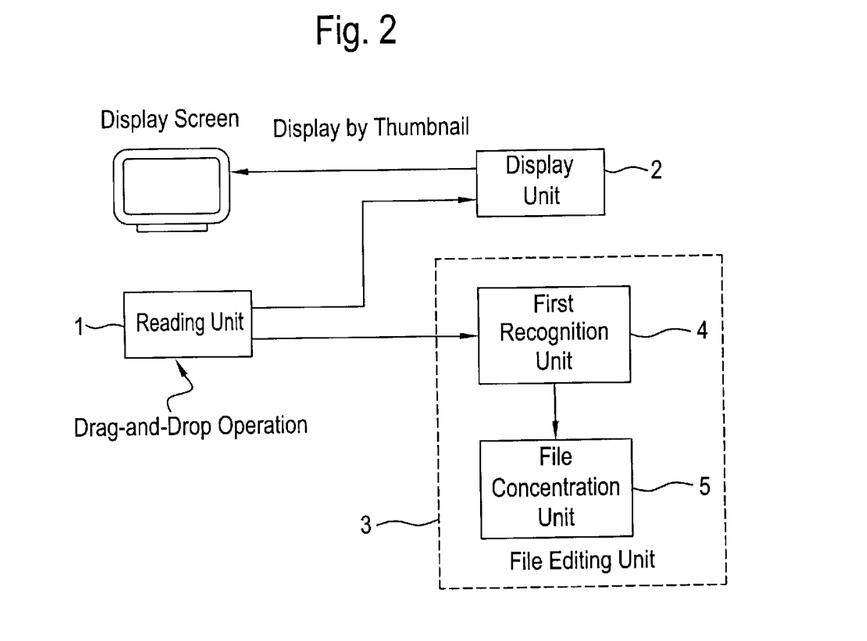
FIG. 2 is a high-level functional diagram of another aspect of the invention.

FIG. 2 is a further high-level representation of the source file editing apparatus of the invention. File editing unit 3 includes a first recognition unit 4 for recognizing a thumbnail located on the left and a thumbnail located on the right and whether the first thumbnail and the second thumbnail are overlapping each other on the screen. File concatenation unit 5 sequentially concatenates a source file, corresponding to a thumbnail located on the right, after a source file, corresponding to a thumbnail located on the left. Such operation is based on recognition by the first recognition unit 4 to edit those two source files, which are to be played in order.

Figure 3:
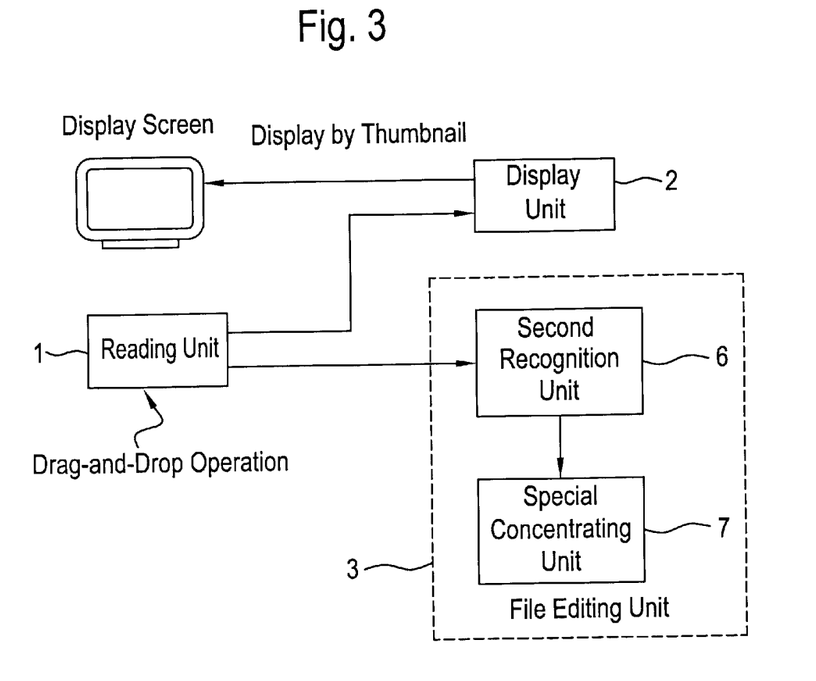
FIG. 3 is a high-level functional diagram of another aspect of the invention.

According to an aspect of the source file editing apparatus of the invention, as shown in FIG. 3, the file editing unit 3 includes a second recognition unit 6 for recognizing a thumbnail located on the top or upper part of the screen and a thumbnail located on the bottom or lower part of the screen, and whether the first thumbnail and the second thumbnail are overlapping each other on the screen. A special concatenation unit 7 for concatenating the source files is operated based on the result of recognition by the second recognition unit 6. A format is used in which a source file corresponding to the second thumbnail is continuously played after a source file corresponding to the first thumbnail is played with fade-out upon recognition that the first thumbnail is located on the top of the second thumbnail. Also, another format is used in which a source file corresponding to the first thumbnail with fade-in is played after a source file corresponding to the second thumbnail is played upon recognition that the first thumbnail is located on the bottom of the second thumbnail.

According to an aspect of the source file editing apparatus of the invention, as shown in FIG. 1, instruction unit 8 is also provided for providing formatting of the concatenation editing that the file editing unit 3 executes when the first thumbnail and the second thumbnail overlap.

According to an aspect of the source file editing apparatus of the invention, thumbnails, i.e. reduced or partial display of images, are arranged and displayed on the entire screen. When images to be displayed are originally small, or when one image is displayed on one screen, it is not necessary to reduce (i.e. thin out) the image to display or partially display the image. In this case, displaying the image "as is", without reducing, is also included in the definition of a "thumbnail display" according to the invention. Also, in the case of a moving image, a reduced or partial display of an image of one scene, i.e. one frame, of the moving image is called a thumbnail (of the moving image) according to the invention.

According to an aspect of the invention, an operator accomplishes a drag-and-drop operation to a thumbnail on the screen using, for example, a mouse. Generally, a drag-and-drop operation involves a continuous operation accomplished using a mouse in which an object is moved while the mouse button is being pressed, i.e. dragging. The mouse button is released at a specified position and the object is dropped. This operation can also be applied in conjunction with a touch panel. Such an equivalent operation can be performed by a continuous operation in which the touch panel is touched by a finger, or a pen, and the object is moved by moving the finger (or pen) while it is touching the panel, i.e. dragging. The finger is then released from the touch panel at a specified position and the object is dropped.

A reading unit 1 reads a path of the drag-and-drop operation done by the operator from the starting point to the ending point. As used herein, the definition of the path of a drag-and-drop operation also includes a case in which only the starting position and the ending position of the drag-and-drop operation are read. That is, it may not be necessary to maintain constant contact with the touch panel or with the mouse button between that starting and ending positions.

When the operator starts a dragging operation of a thumbnail on the screen, the thumbnail corresponding to and located at the starting position of the dragging operation is moved and displayed in accordance with the dragging operation. When the first thumbnail that is moved and displayed overlaps the second thumbnail displayed on the screen, a film editing unit 3 detects the manner in which they are overlapping each other. In addition, the film editing unit 3 implements a predefined concatenation in accordance with how the two thumbnails are overlapping and sequentially concatenates, i.e. links, the source files respectively corresponding to the two thumbnails to edit in a continuously played format. Therefore, the operator can intuitively concatenate and edit at least two source files displayed as thumbnails on the screen by executing the drag-and-drop operation a single time.

According to an aspect of the invention, the reading unit 1 corresponds to a touch panel. The operator executes the drag-and-drop control using a finger or a pen against the touch panel. Thus, the source file editing apparatus provides increased interaction by using the touch panel. Therefore, beginners can implement sophisticated editing operations.

According to an aspect of the invention, the first recognition unit 4 recognizes, for first and second thumbnails overlapping each other on the screen, which thumbnail is located on the right or left. The file concatenating unit 5 edits the two source files corresponding to the thumbnails into a format in which the source files are successively played. The source file corresponding to the thumbnail on the left is first played, followed by the source file corresponding to the thumbnail on the right.

According to an aspect of the invention, the second recognition unit 6 recognizes, for the first and second thumbnails overlapping each other on the screen, which thumbnail is located on the top and which thumbnail is located on the bottom. When the first thumbnail overlaps the top of the second thumbnail, a special concatenation unit 7 edits the first source file into a format in which the first source file corresponding to the first thumbnail is played to fade out. Then, the second source file corresponding to the second thumbnail is edited into a format in which the second source file is continuously played after the first source file. When the first thumbnail overlaps the bottom of the second thumbnail, the special concatenation unit 7 edits the first source file such that the first source file is played to fade in, after the second source file is played.

According to an aspect of the invention, when the operator executes the drag-and-drop operation to overlap two thumbnails, a description of the contents of the source files to be concatenated and edited is displayed and, for example, positioned near the two thumbnails on the screen.

Figure 4:
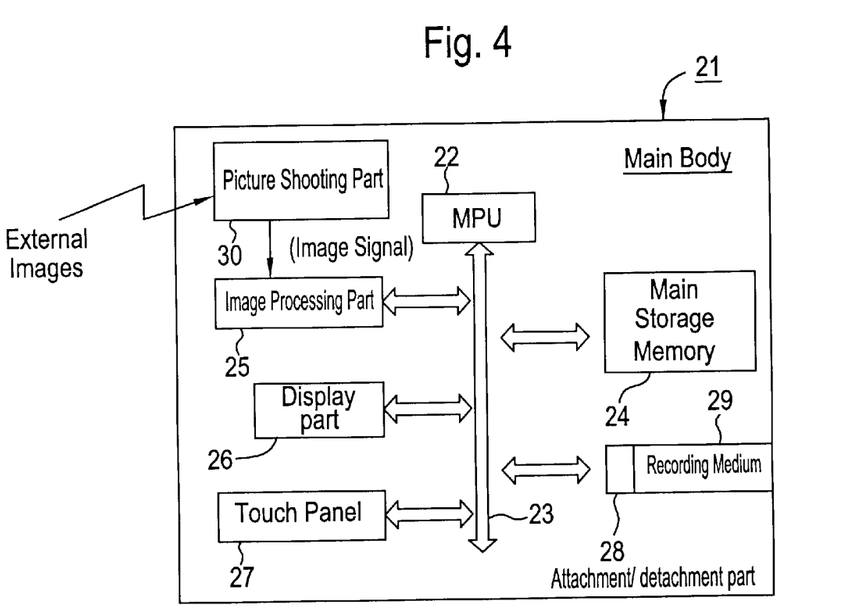
FIG. 4 is a block diagram of an embodiment of the invention.

FIG. 4 is a block diagram of an embodiment of the invention. In FIG. 4, an MPU 22 is arranged on a main body 21. The MPU 22 is connected to a main storage memory 24, an image processing part 25, a display part 26, and a touch panel 27 through a data bus 23. The touch panel 27 can be comprised of a pressure sensitive type, a resistance film type, or a light sensitive position detection type. In addition, a mouse can be substituted for the touch panel 27.

A recording medium 29 is removable from the main body 21 since it is connected to the data bus 23 through an attachment/detachment part 28. A magnetic recording medium, an optical recording medium, an magnetooptical recording medium, or a semiconductor recording medium (ZIP of flash memory, for example) can be used as the recording medium 29. Also, an input terminal of the image processing part 25 is connected to an output terminal of a picture shooting part 30.

In accordance with one embodiment of the invention, the reading unit 1 corresponds to the touch panel 27 and the MPU 22. The display unit 2 corresponds to the display control part of the MPU 22 and the display part 26. The film editing unit 3 corresponds to a file editing part of the MPU 22. According to an aspect of the invention, the first recognition unit 4 and the film concatenation unit correspond to the MPU 22.

Figure 5:
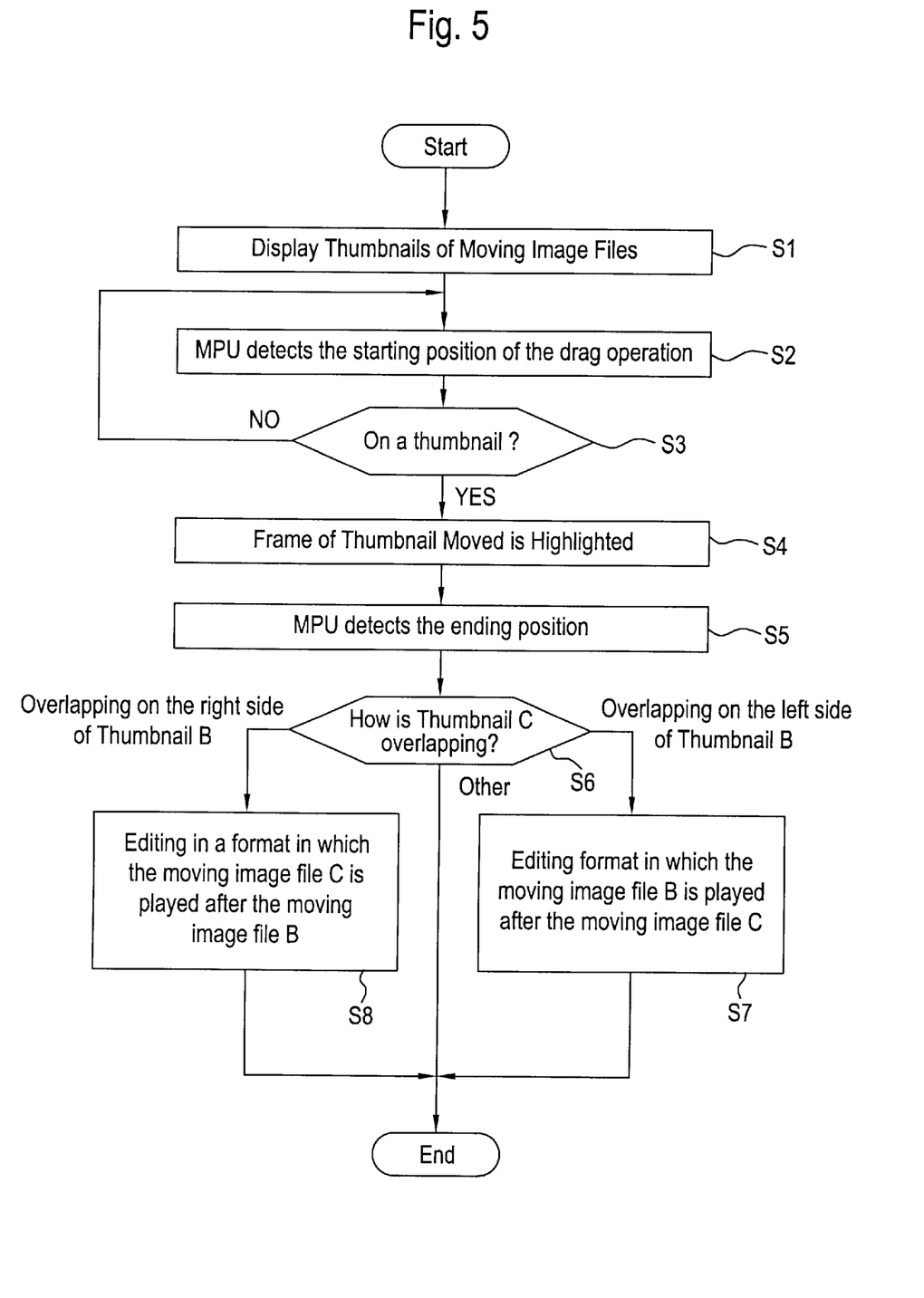
FIG. 5 is a flow chart showing operation of an embodiment of the invention.

FIG. 5 is a flow chart showing operation of an embodiment of the invention. FIGS. 8 through FIG. 11 are diagrams showing thumbnail displaying screens. The operations of an embodiment are hereinafter described with reference to FIG. 4, FIG. 5, and FIG. 8 through FIG. 11.

The picture shooting part 30 (e.g., a CCD) photoelectrically converts an image of an external object and outputs image signals to the image processing part 25. The image processing part 25 digitally converts the image signals, and compresses and codes the data. The image signals processed in the image processing part 25 are stored in the recording medium 29 as an image file. The image files stored in the recording medium 29 are all assumed to be moving image files.

Figure 8:
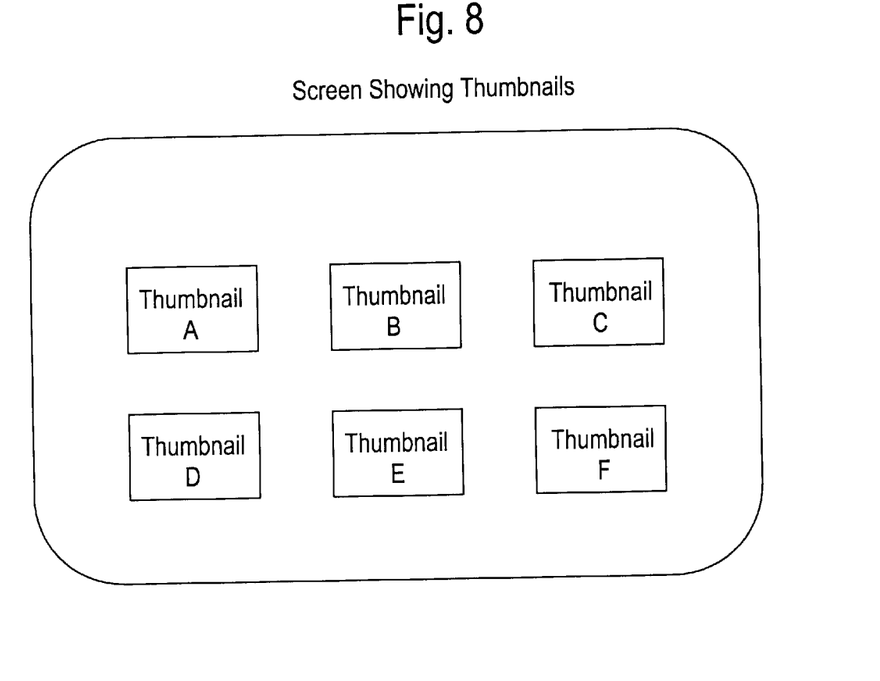
FIG. 8 shows an example of a thumbnail display screen according to an aspect of the invention.

The display controlling part of the MPU 22 reads a plurality of moving image files recorded in the recording medium 29, creates a thumbnail for a first scene of each moving image file, and lists the thumbnails (step S1 in FIG. 5). In FIG. 8, thumbnails of six moving image files are displayed as thumbnails A through F. Then, the MPU 22 obtains each of the attributes of each image file, such as type of image file, e.g. a moving image file or still image file; amount of the image data; number of frames; data concerning creation; and title. For instance, if the attribute is set as a write protection attribute, deletion of the image file due to misoperation can be prevented.

Figure 9:
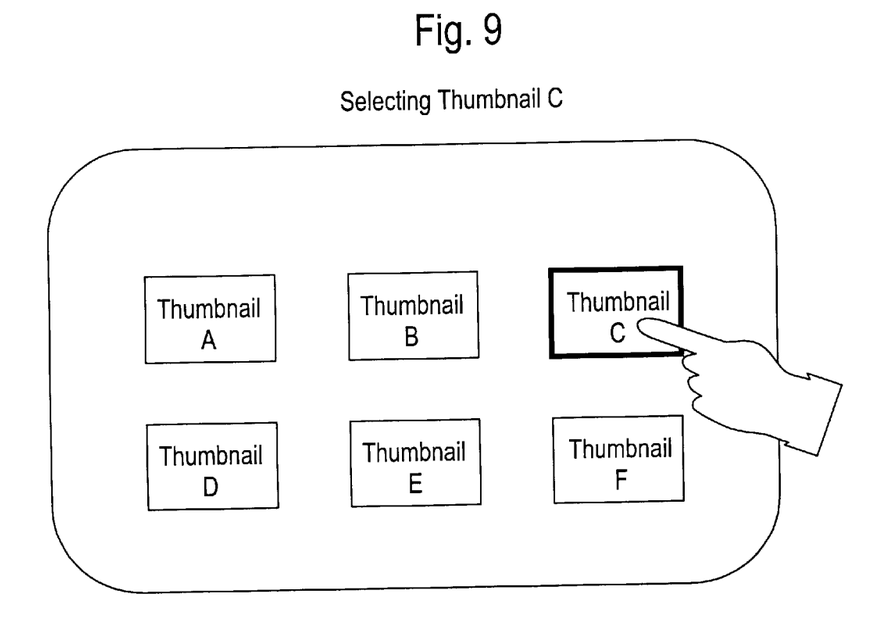
FIG. 9 shows an example of a thumbnail display screen according to an aspect of the invention.

When the operator touches the touch panel 27 by finger, or by a pen, the MPU 22 detects the position (step S2 in FIG. 5) and determines whether the position is on a thumbnail (step S3 in FIG. 5). When the MPU 22 determines that the detected position is on a thumbnail, it determines that the operator selected a thumbnail and a moving image corresponding to the thumbnail. Then, a frame of the selected thumbnail is highlighted (step 4 in FIG. 5). FIG. 9 shows a situation where the thumbnail C has been selected.

Figure 10:
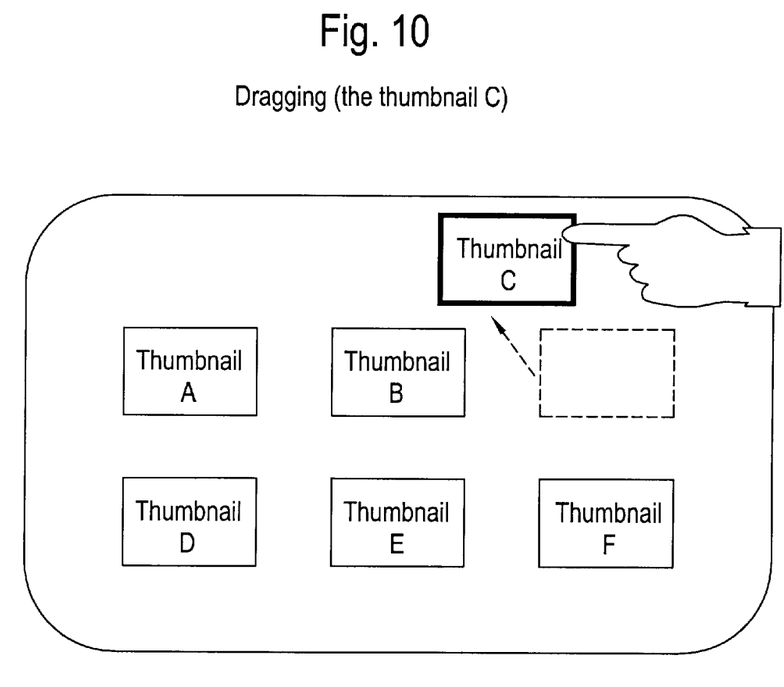
FIG. 10 shows a thumbnail display screen showing dragging the thumbnail.

When the operator moves the finger while touching the touch panel 27 (dragging operation), the thumbnail C follows the movement as shown in FIG. 10. Since known GUI (Graphical User Interface) technology is utilized in operation of the thumbnails with a touch panel, the explanation thereof is omitted here.

When the operator releases the finger from the touch panel 27 (dropping operation), the MPU 22 detects the position of the release (step S5 in FIG. 5). The MPU 22 determines how two thumbnails are overlapping each other, based on the detected position of the thumbnails (step S6 in FIG. 5). Based on the displayed positions of the thumbnails C and B on the screen, a determination is made as to whether the thumbnail C is overlapping at a position on the left or right side of the thumbnail B, or if some other condition is present.

When the thumbnail C is overlapping on the left side of the thumbnail B, the two moving image files which correspond to the thumbnails B and C are concatenated and edited in a format. The moving image file B, which corresponds to the thumbnail B, is continuously played after the moving image file C, which corresponds to the thumbnail C (step S7 in FIG. 5). This operation can be performed by the file editing part of the MPU 22 so as to newly create a moving image file in which the two moving image files are concatenated.

When the thumbnail C is overlapping on the right side of the thumbnail B, the two moving image files are concatenated in a format in which the moving image file C is continuously played after the moving image file B (step 8 in FIG. 5). For other cases, the process ends without editing.

The main storage memory 13 is used for a temporary storage of data during editing. As described above, this embodiment of the invention can accomplish high level editing operations, such as concatenation of files, using an intuitive and simple drag-and-drop operation. According to an aspect of the source file editing apparatus of the invention, the second recognition unit 6 and the special concatenation unit 7 correspond to the MPU 22.

Figure 6:
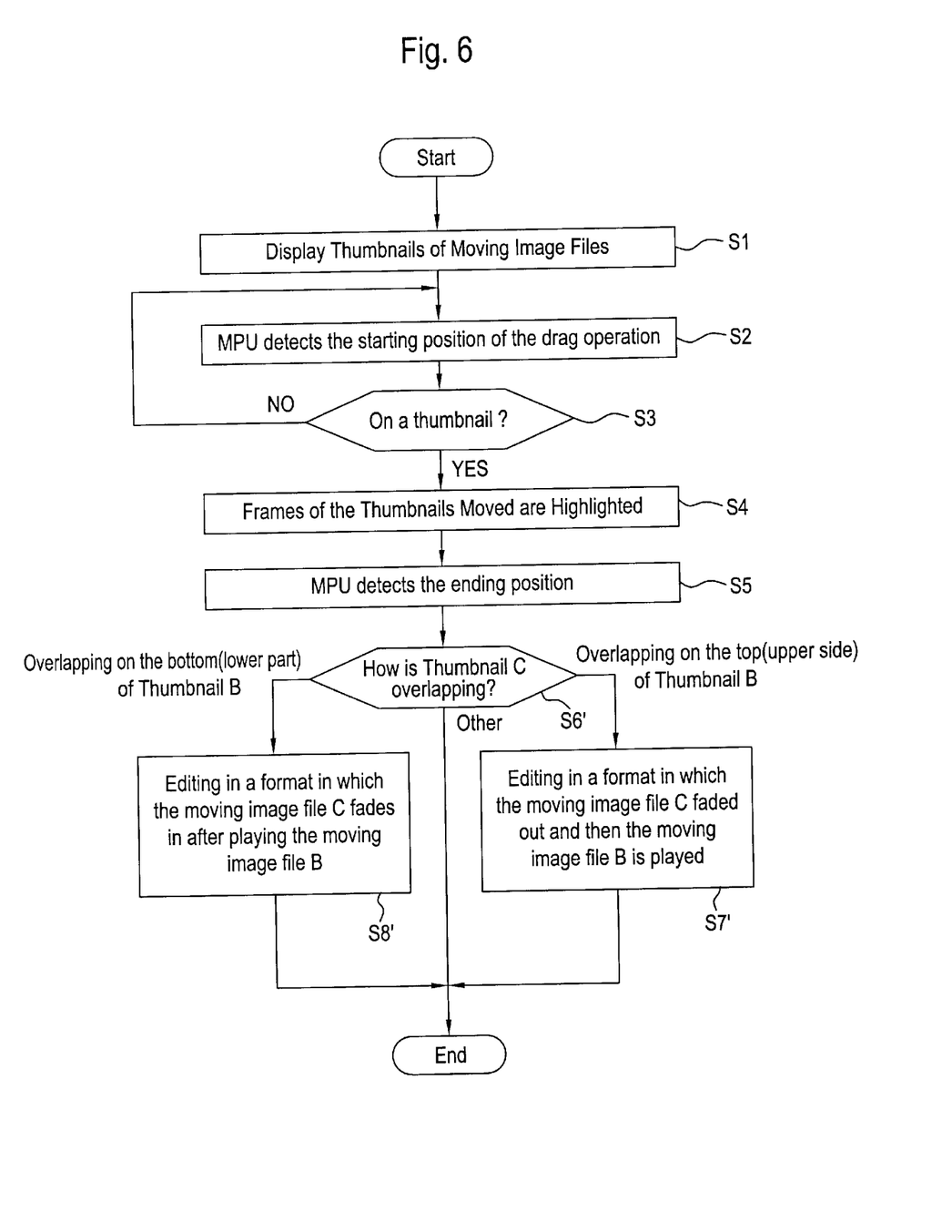
FIG. 6 is a flow chart showing operation of another embodiment of the invention.
Figure 12:
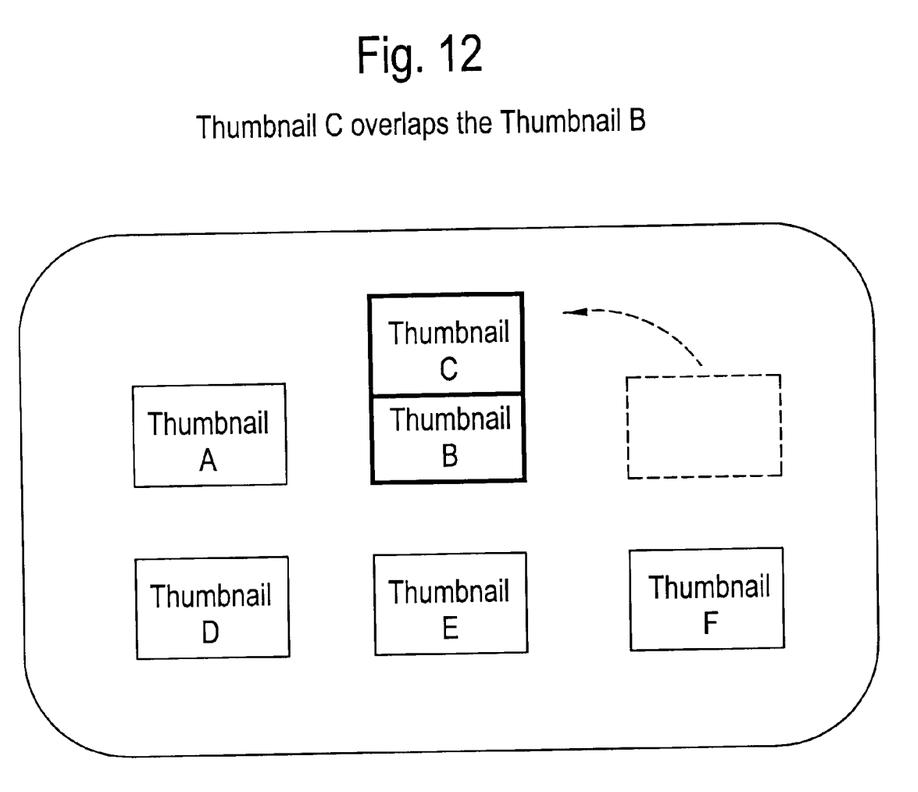
FIG. 12 shows a thumbnail display screen with overlapping thumbnails.

FIG. 6 is a flow chart showing operations in accordance with another embodiment of the invention. In addition, FIG. 12 shows a thumbnail displaying screen. Operations of this embodiment are described hereinafter with reference to FIG. 4, FIG. 6, FIG. 8 through FIG. 10, and FIG. 12.

The picture shooting part 30 photoelectrically converts an image of an external object and outputs image signals to the image processing part 25. The image processing part 25 digitally converts the image signals, and compresses and codes the data. The image signals processed by the image processing part 25 are stored in the recording medium 29 as image files. As discussed herein, all of the image files stored in the recording medium 29 are assumed to be moving image files.

The display control part of MPU 22 reads the moving image files to be recorded in the recording medium 29 and displays a thumbnail corresponding to each moving image file as shown in FIG. 8 (step S1 of FIG. 6).

Then, MPU 22 obtains each of the attributes of each image file, such as type of image file, e.g. moving image file or still image file; amount of the image data; number of frames; data concerning creation; and title.

When the operator touches the touch panel 27 by finger, or by a pen, the MPU 22 detects the position (step S2 in FIG. 6) and determines whether the position is on a thumbnail (step S3 in FIG. 6). When the MPU 22 determines that the detected position is on a thumbnail, the MPU determines that the operator selected a thumbnail and a moving image corresponding to the thumbnail. Then, a frame of the selected thumbnail is highlighted (step 4 in FIG. 6). FIG. 9 shows a situation where the thumbnail C is has been selected. When the operator moves the finger while touching the touch panel 27 (dragging operation), the thumbnail C follows the movement as shown in FIG. 10. When the operator releases the finger from the touch panel 27 (dropping operation), the MPU 22 detects the position of release (step S5 in FIG. 6).

The MPU 22 determines how two thumbnails overlapping each other based on the position detected (step S6' in FIG. 6). Here, a determination is made as to whether the thumbnail C is overlapping at a position on the top (upper side) or bottom (lower side) of the thumbnail B, or whether another condition is present.

As shown in FIG. 12, when the thumbnail C overlaps on the top of the thumbnail B, the two moving image files are edited into a format in which the moving image file B, corresponding to the thumbnail B, is continuously played after the moving image file C, corresponding to the thumbnail C, is played with fade-out (step S7' in FIG. 6). This operation can be performed by the file editing part of the MPU 22 to create a file in a format in which the moving image file C is played with fade-out and is joined to a file in a format in which the moving image file B is normally played. When the thumbnail C is overlapping on the bottom of the thumbnail B, the two moving image files are edited into a format in which the moving image file C is continuously played with fade in after the moving image file B (step S8' in FIG. 6). For other situations, the process ends without editing. The main storage memory 13 is used for a temporary storage of data during editing. As described above, this embodiment of the invention can accomplish sophisticated editing operations, such as concatenation of files and adding fade-in and fade-out effects using an intuitive and simple drag-and-drop operation.

Next, another embodiment of the invention will be explained. According to an aspect of the invention and with reference to FIG. 4, the instruction unit 8 corresponds to the MPU 22 and the display part 26.

Figure 7:
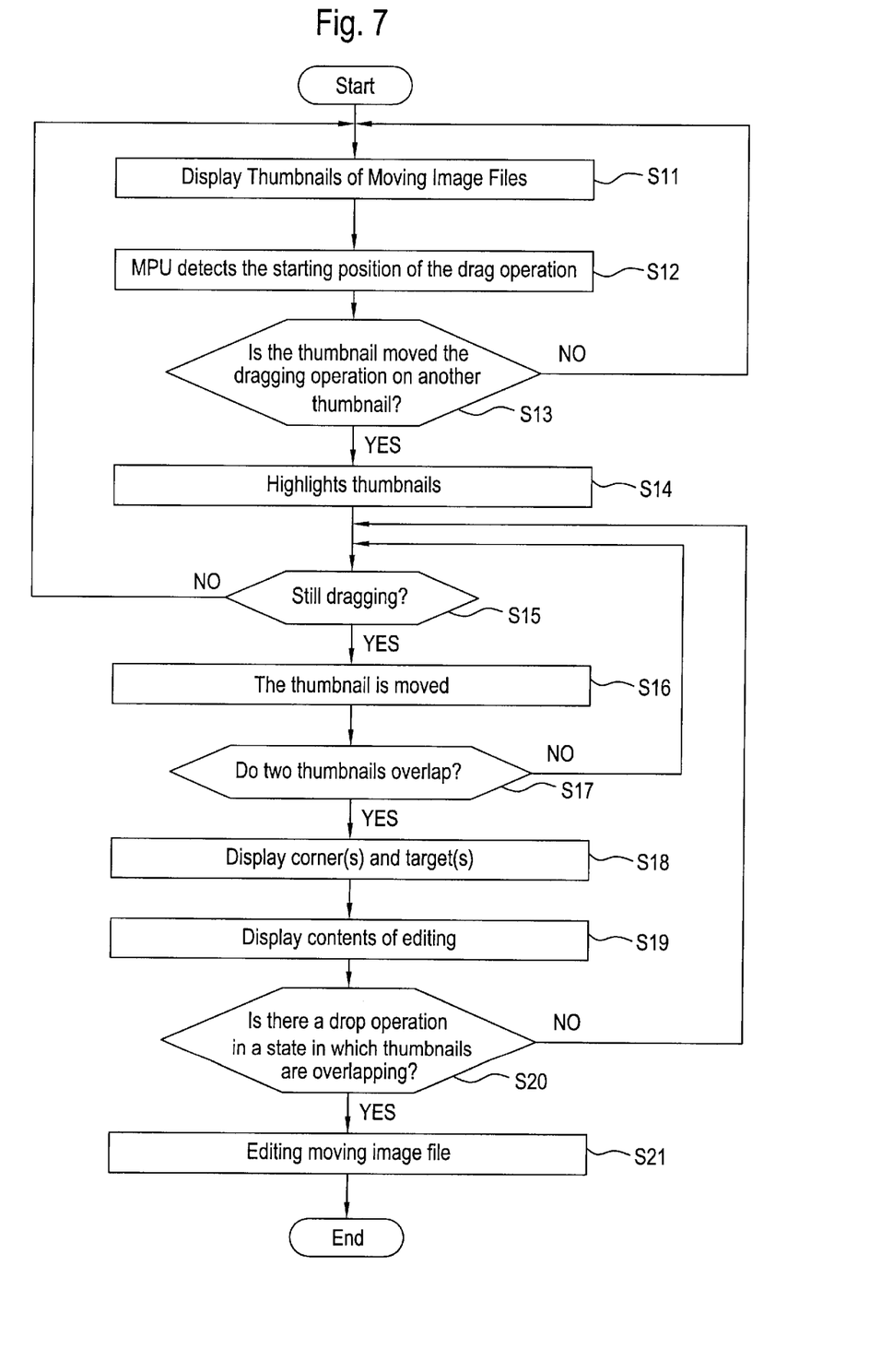
FIG. 7 is a flow chart showing the operation of another embodiment of the invention.
Figure 13:
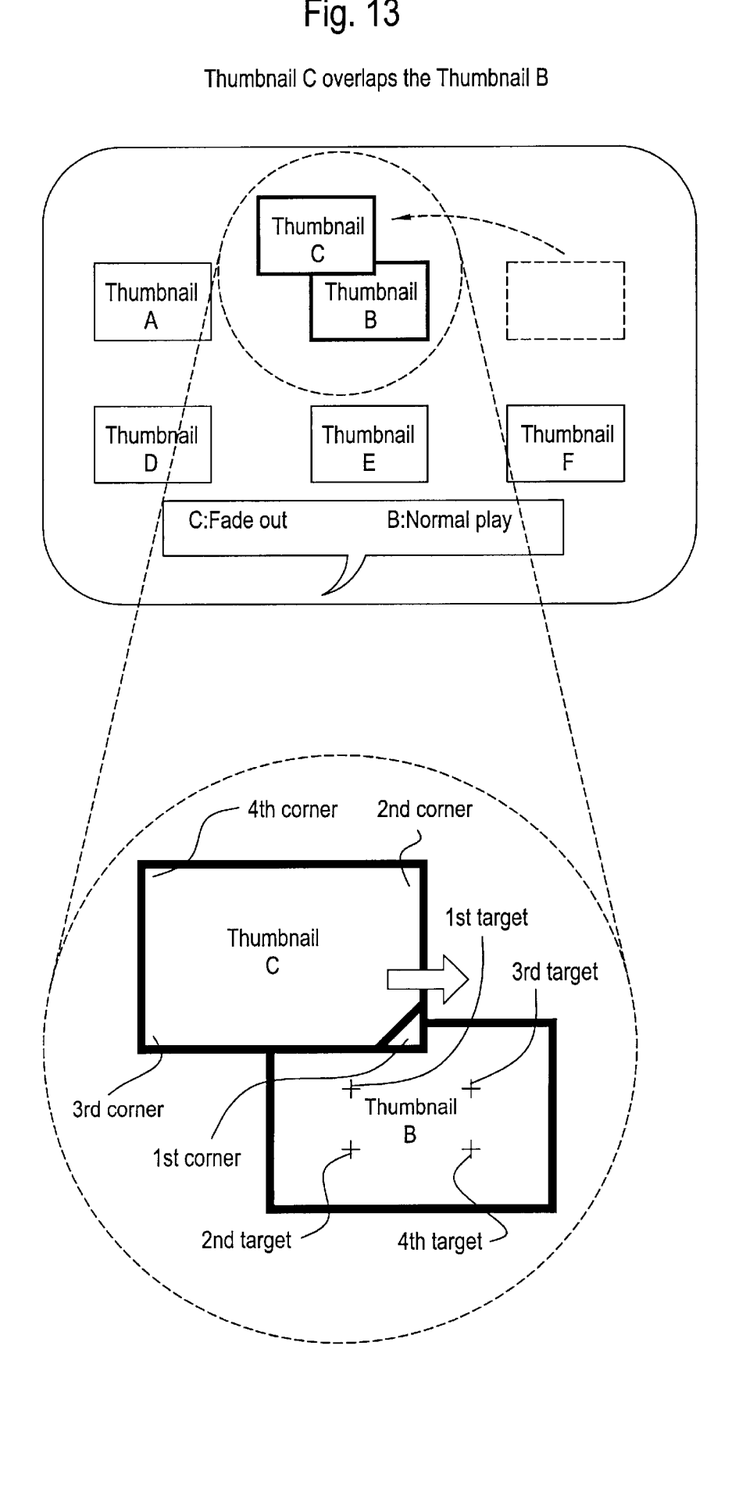
FIG. 13 shows a thumbnail display screen with an exploded view.

FIG. 7 is a flow chart showing operations of another embodiment of the invention. Also, FIG. 13 is a diagram showing a thumbnail displaying screen relating to this embodiment.

The operations of this embodiment are described hereafter with reference to FIG. 4, FIG. 7, FIG. 8 through FIG. 10, and FIG. 13. The picture shooting part 30 photoelectrically converts an image of an external object and outputs image signals to the image processing part 25. The image processing part 25 digitally converts the image signals and compresses and codes the data.

The image signals processed at the image processing part 25 are stored in the recording medium 29 as an image file. Here, all of the image files stored in the recording medium 29 are assumed to be moving image files.

The display control part of MPU 22 reads the moving image files to be recorded in the recording medium 29 and displays a thumbnail corresponding to each moving image file as shown in FIG. 8 (step S11 of FIG. 7). At that time, the MPU 22 obtains each of the attributes of each image file, such as a type of image file, e.g. a moving image file or still image file; amount of the image data; number of frames; data concerning creation; and title.

When the operator touches the touch panel 27 by finger, the MPU 22 detects the position (step S12 in FIG. 7) and determines whether the position is on a thumbnail (step S13 in FIG. 7). When the MPU 22 determines that the detected position is on a thumbnail, it determines that the operator selected a thumbnail and the moving image corresponding to the thumbnail. Then, a frame of the selected thumbnail is highlighted (step S14 in FIG. 7). FIG. 9 shows a situation where the thumbnail C has been selected.

Figure 11:
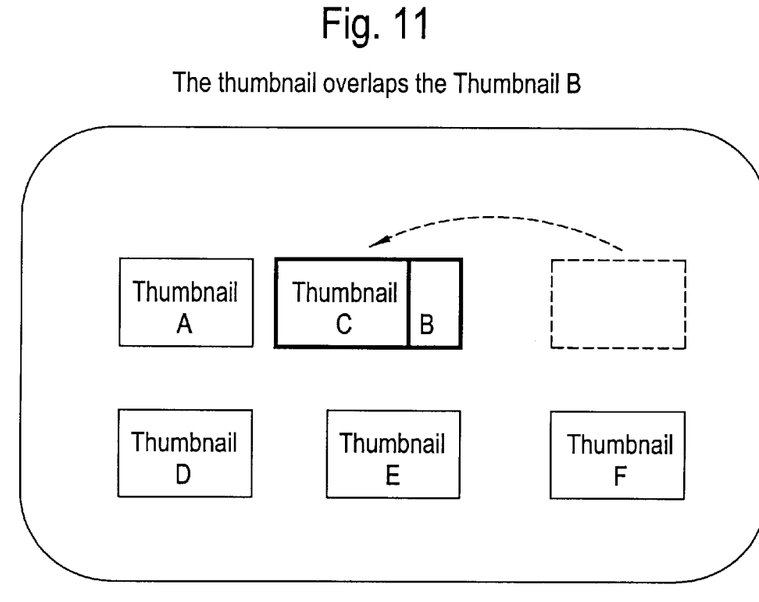
FIG. 11 shows a thumbnail display screen with overlapping thumbnails.

When the operator moves the finger while touching the touch panel 27 (dragging operation), the thumbnail C follows the movement as shown in FIG. 1 (step S15 and step S16 in FIG. 7). MPU 22 then determines whether the thumbnail that is moved is overlapping another thumbnail displayed on the screen (step S17 in FIG. 7). As shown in FIG. 11, a determination is made as to whether the thumbnail C and the thumbnail B are overlapping each other. When the two thumbnails are not overlapping, the process returns to step S15, and the MPU 22 determines whether the dragging operation is still continuing.

When the two thumbnails are overlapping each other, the MPU 22 detects a corner, among four corners, of the moved thumbnail which is overlapping with the other thumbnail, and highlights the corner. In FIG. 13, since the first corner of the thumbnail C is overlapping thumbnail B, the first corner is highlighted. Moreover, at this time four targets are displayed on thumbnail B as shown in FIG. 13 (step S18 in FIG. 7). Furthermore, the MPU 22 determines which target is the closest to the corner that has been detected and highlights the closest target.

In the MPU 22, editing formats to be executed are preset depending on the relationships between the corner detected and the target closest to the corner. The MPU 22 displays the formats for editing below the thumbnail displaying screen when two thumbnails overlap each other (step S19 in FIG. 7). Settings are made so that when the first corner is near the first target, two moving image files are edited into a format. Specifically, the moving image file of the thumbnail having the first target (in this case thumbnail B) is played after the moving image file of the thumbnail having the first corner (in this case thumbnail C), which is played with fade-out. Also, when the second corner is near the second target, the two moving image files are edited into a format in which the moving image file corresponding to thumbnail B is played with fade-in after the moving image file corresponding to the thumbnail C is played. Further, when the third corner is near the third target, the two moving image files are edited into a format in which the moving image file corresponding to thumbnail C is played after the moving image file corresponding to thumbnail B, which is played with fade-out.

When the fourth corner is near the fourth target, the two moving image files are edited into a format in which the moving image file corresponding to thumbnail C is played with fade-in, and is played after the moving image file corresponding to thumbnail B is played. As described above, with four corners and four targets, 16 different ways of editing can be preset by the MPU 22.

The MPU 22 determines whether there has been a dropping operation where two thumbnails are overlapping each other (step S20 in FIG. 7). If there has not been any dropping operation, the process returns to the step S15 and determines whether the dragging operation is still continuing. If there has been a dropping operation, the positional relationships between the corner and the target at that time are determined. Editing is executed with respect to the positional relationships (step S21 in FIG. 7). Since the first corner of thumbnail C is located near the first target of the thumbnail B, the two moving image files are edited into a format in which the moving image file B is continuously played after the moving image file C is played with fade-out.

As described above, in the source file editing apparatus of this embodiment, various kinds of editing can be accomplished in a timely manner with one drag-and-drop operation.

While a touch panel 27 or a mouse are described in conjunction with the above embodiments as a means to accomplish the drag-and-drop operation, the invention is not limited to such. For example, drag-and-drop operations can be accomplished even with, for example, arrow keys or cross keys.

Also, although image input using the picture shooting part 30 is described in conjunction with the above embodiments, the invention is not limited to this. For instance, the image data can be read in from an external source or memory medium.

Furthermore, even though the operation of two thumbnails being selected with one drag-and-drop operation is described in conjunction with the above embodiments, the invention is not limited to this. For example, three or more thumbnails can be selected by continuously accomplishing multiple drag-and-drop operations.

Although concatenation, fade-in, and fade-out operations are described in conjunction with the above embodiments as a means for editing two moving image files, the invention is not limited to this. Other ways of editing two moving image files can be used. For example, the moving image files can be continuously played by adding special effects to the files, such as overlap, chromakey, or wipe, to the files.

In addition, other concatenation editing can be performed when concatenating a still image file and a moving image file. Depending on the positional relationships between the corners and targets, play time for the still image file can be changed and concatenated to the moving image file.

Also, various settings are possible. For instance, when the first corner is near the first target, settings can be such that the still image file is played for 1 second and concatenated to the moving image file. Alternatively, when the second corner is near the second target, the still image file is played for 2 seconds and concatenated to the moving image file.

In the embodiments described above, even though the contents of concatenation were determined depending on the positions of overlapping thumbnails, the invention is not limited to this. For example, formats of the editing can be determined based on a direction of the overlapping of the thumbnails, e.g. overlapping from the top, from the bottom, from the right, from the left, and diagonally. Moreover, although a thumbnail was automatically created using the first scene of the moving file in the first described embodiment, the invention is not limited to this. For example, the operator can select any scene of the moving image file to create the thumbnail for that file.

In addition, even though four targets were considered in the third described embodiment, the invention is not limited to this. The targets can exist at any position on the thumbnail. The number of targets also are not limited. Further, editing formats were preset in the third described embodiment. However, the invention is not limited to this. The operator can set a wide variety of formats. Also, although the editing formats are displayed on the screen in the third described embodiment, the invention is not limited to this. The formats can be conveyed to an operator using voice.

According to an aspect of the source editing apparatus of the invention, since only a single screen in which thumbnails are arranged has to be displayed, it is not necessary to display a plurality of windows at the same time. Thus, the display space can be utilized effectively. In particular, the invention provides a portable and compact source file editing apparatus. Because thumbnails can be displayed in the entire area of the screen, each thumbnail can be displayed as large as possible. Therefore, the thumbnails are easy to view, and the operator can easily determine the images.

In addition, since the thumbnails can be displayed as large as possible, selection of the thumbnails can be accomplished accurately and quickly. The selecting method of the invention is especially appropriate when a touch panel, for example, is used since an area identified by a finger is large. Moreover, because at least two source files can be selected with a one time drag-and-drop operation, operation steps for the selection are decreased by half compared to conventional methods. As a result, the time required for editing can be shortened enormously while the operability is greatly increased. Further, because the operations can be accomplished on a single screen in which thumbnails are arranged, it is not necessary to deal with a plurality of windows. Thus, learning the editing operation is simplified and the required learning time is remarkably shortened. Also, with the mastering of one operation, i.e., a drag-and-drop operation, the operator can easily accomplish various ways of editing.

According to another aspect of the invention, a touch panel is used as an operation reading unit. Therefore, even a person who uses the apparatus for the first time can accomplish sophisticated editing operations using intuitive controls. In addition, because no input unit such as a mouse is necessary, a source file editing apparatus is provided which is excellent in terms of portability.

According to another aspect of the invention, since concatenation editing can be accomplished by an intuitive operation to overlap thumbnails, editing can be achieved quickly by people who use the apparatus for the first time.

According to another aspect of the invention, sophisticated editing can be performed, such as fade-in and fade-out operations, by using a simple operation to overlap thumbnails.

According to another aspect of the invention, since the editing formats are displayed when concatenation editing is executed, the operator can quickly understand the format of the editing. Thus, errors in editing operations are prevented.

As described above, with the source file editing apparatus of the invention, sophisticated and varied editing operations can be achieved using intuitive and simple controls. In addition, since editing operations can be accurately accomplished even using a small display screen, the invention offers a source file editing apparatus with excellent portability.

While the invention has been described in conjunction with specific embodiments thereof, it is evident that many alternatives, modifications and variations may be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A source file editing apparatus comprising:
    reading means for reading a path from a starting point to an ending point of a drag-and-drop operation;
    display means for respectively displaying on a screen a plurality of thumbnails corresponding to a plurality of source files including at least one of image data and voice data files, and for moving a first thumbnail corresponding to the starting point of the drag-and-drop operation read by said reading means to the ending point of the drag-and-drop operation; and
    file editing means for detecting how the first thumbnail moved and displayed by said display means and a second thumbnail displayed on said screen are overlapping each other, and for executing preset concatenation editing to the source files corresponding to each of said first and second thumbnails depending on how said thumbnails are overlapping each other.

2. The source file editing apparatus according to claim 1, wherein said reading means includes a touch panel which detects a position of a contacting body that contacts on a surface of said touch panel.

3. The source file editing apparatus according to claim 1, wherein said file editing means includes recognition means for recognizing whether said second thumbnail is located on the left or on the right of said first thumbnail when said first and second thumbnails overlap on said screen; and
    file concatenation means for sequentially concatenating a source file corresponding to the thumbnail located on the right after a source file corresponding to a thumbnail located on the left based on the recognition by said recognition means.

4. The source file editing apparatus according to claim 1, wherein said file editing means includes recognition means for recognizing a thumbnail located on the top and a thumbnail located on the bottom of said first thumbnail when said first and second thumbnails overlap on said screen; and
    concatenation means for concatenating the source files, based on recognition by said recognition means, into a format in which a source file corresponding to said second thumbnail is played after a source file corresponding to said first thumbnail is played with fade-out upon recognition that said first thumbnail overlaps the top of said second thumbnail, and in which a source file corresponding to said first thumbnail is played with fade-in after a source file corresponding to said second thumbnail is played upon recognition that said first thumbnail overlaps the bottom of said second thumbnail.

5. The source file editing apparatus according to claim 1, further comprising instruction means for indicating formats of the concatenation editing that said file editing means executes when said first thumbnail and said second thumbnail overlap.

6. A source file editing apparatus comprising:
    a reader that reads a path from a starting point to an ending point of a drag-and-drop operation;
    a display processor that respectively displays on a screen a plurality of thumbnails corresponding to a plurality of source files including at least one of image data and voice data files, and that moves a first thumbnail corresponding to the starting point of the drag-and-drop operation read by said reader to the ending point of the drag-and-drop operation; and
    a file editor that detects how the first thumbnail moved and displayed by said display processor and a second thumbnail displayed on said screen are overlapping each other, and that executes preset concatenation editing to the source files corresponding to each of said first and second thumbnails depending on how said thumbnails are overlapping each other.

7. The source file editing apparatus according to claim 6, wherein reader includes a touch panel which detects a position of a contacting body that contacts on a surface of said touch panel.

8. The source file editing apparatus according to claim 6, wherein said file editor includes a recognition unit that recognizes whether the second thumbnail is located on the left or the right of said first thumbnail when said first and second thumbnails overlap on said screen; and
    a file concatenator that sequentially concatenates a source file corresponding to the thumbnail located on the right after a source file corresponding to a thumbnail located on the left based on the recognition by said recognition unit.

9. The source file editing apparatus according to claim 6, wherein said file editor includes a recognition unit that recognizes a thumbnail located on the top and a thumbnail located on the bottom of said first thumbnail when said first and second thumbnails overlap on said screen; and
    a concatenator that concatenates the source files, based on recognition by the recognition unit, into a format in which a source file corresponding to said second thumbnail is played after a source file corresponding to said first thumbnail is played with fade-out upon recognition that said first thumbnail overlaps the top of said second thumbnail, and in which a source file corresponding to said first thumbnail is played with fade-in after a source file corresponding to said second thumbnail is played upon recognition that said first thumbnail overlaps the bottom of said second thumbnail.

10. The source file editing apparatus according to claim 6, further comprising an instruction unit that indicates formats for the concatenation editing that said file editor executes when said first thumbnail and said second thumbnail overlap.

11. A method of source file editing, said method comprising the steps of:

reading a path from a starting point to an ending point of a drag-and-drop operation;

displaying on a screen a plurality of thumbnails corresponding to a plurality of source files including at least one of image data and voice data files, and moving a first thumbnail corresponding to the starting point of the drag-and-drop operation to the ending point of the drag-and-drop operation; and detecting how the first thumbnail and a second thumbnail displayed on said screen are overlapping each other, and executing preset concatenation editing to the source files corresponding to said first and second thumbnails depending on how said thumbnails are overlapping each other.

12. The method of claim 11, wherein said reading step includes touching a touch panel with a contact body, and wherein said detecting step includes detecting a position of the contacting body at the ending point.

13. The method of claim 11, wherein said step of detecting includes recognizing whether said second thumbnail is located on the left or on the right of said first thumbnail when said first and second thumbnails overlap on said screen; and sequentially concatenating a source file corresponding to the thumbnail located on the right after a source file corresponding to a thumbnail located on the left based on said recognizing step.

14. The method of claim 11, further comprising recognizing whether said first thumbnail overlaps the top or overlaps the bottom of said second thumbnail, when said first and second thumbnails overlap on said screen; and concatenating the source files, based on said recognizing step into a format in which a source file corresponding to said second thumbnail is played after a source file corresponding to said first thumbnail is played with fade-out upon recognition that said first thumbnail overlaps the top of said second thumbnail, and in which a source file corresponding to said first thumbnail is played with fade-in after a source file corresponding to said second thumbnail is played upon recognition that said first thumbnail overlaps the bottom of said second thumbnail.

15. The method of claim 11, further including indicating format instructions for said concatenation editing when said first thumbnail and said second thumbnail overlap.

* * * * *